(12) United States Patent
Said et al.

(10) Patent No.: US 11,848,642 B2
(45) Date of Patent: Dec. 19, 2023

(54) SOLAR PHOTOVOLTAIC PANEL FOG/MIST COOLING SYSTEM

(71) Applicant: University of Sharjah, Sharjah (AE)

(72) Inventors: Zafar Said, Sharjah (AE); Ahmed Amine Hachicha, Sharjah (AE)

(73) Assignee: UNIVERSITY OF SHARJAH, Sharjah (AE)

( * ) Notice: Subject to any disclaimer, the term of this patent is extended or adjusted under 35 U.S.C. 154(b) by 388 days.

(21) Appl. No.: 16/725,552

(22) Filed: Dec. 23, 2019

(65) Prior Publication Data

US 2021/0194422 A1 Jun. 24, 2021

(51) Int. Cl.
*H02S 40/42* (2014.01)
*F25B 19/04* (2006.01)

(52) U.S. Cl.
CPC ............ *H02S 40/425* (2014.12); *F25B 19/04* (2013.01)

(58) Field of Classification Search
CPC .............................................. H02S 40/42–425
See application file for complete search history.

(56) References Cited

U.S. PATENT DOCUMENTS

| 9,236,515 | B2 | 1/2016 | Brottier et al. |
| 10,050,584 | B2 | 8/2018 | Yuque |
| 2014/0299174 | A1 | 10/2014 | Yu et al. |
| 2017/0272031 | A1* | 9/2017 | Yuque ............... H02S 40/425 |

FOREIGN PATENT DOCUMENTS

| CN | 106998188 A | * | 8/2017 | |
| CN | 107110563 A | * | 8/2017 | ............ H02S 40/42 |
| CN | 108390640 A | * | 8/2018 | .......... H02S 40/425 |
| FR | 2961024 A1 | * | 12/2011 | .......... H02S 40/425 |
| JP | 2011100782 A | * | 5/2011 | |
| JP | 2012256823 A | * | 12/2012 | |
| WO | WO-2020021039 A1 | * | 1/2020 | ............ H02S 40/42 |

OTHER PUBLICATIONS

Rajasekar, et al. "Efficiency of solar PV panel by the application of coconut fibres saturated by earthen clay pot water." Environmental technology (2019): 1-8. (Year: 2019).*
Ikeuchi Hydraulic Spray Nozzles Catalog.*

* cited by examiner

*Primary Examiner* — Jayne L Mershon
(74) *Attorney, Agent, or Firm* — Hayes Soloway PC

(57) ABSTRACT

There is provided a solar photovoltaic panel fog/mist cooling system which comprises at least one solar photovoltaic panel, and at least one nozzle arranged at a back side of the at least one solar photovoltaic panel and configured to generate a fog/mist applied onto a back side of the at least one solar photovoltaic panel.

20 Claims, 5 Drawing Sheets

SOLAR PHOTOVOLTAIC PANEL FOG/MIST COOLING SYSTEM

FIELD OF THE INVENTION

The present invention relates to cooling solar photovoltaic panels, and in particular to a solar photovoltaic panel fog/mist cooling system.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

With nearly 400 Gigawatt (GW) of global installed capacity, and expected to be the world's largest source of energy in the next few decades, solar photovoltaics systems are set to become a largely influential part of power generation. Solar photovoltaic systems rely on sunlight striking panels of photovoltaic elements to produce electricity. The use of solar photovoltaic panels has been known to involve several drawbacks that hold them back from releasing their full potential. One of the drawbacks is high temperatures of the solar photovoltaic panels during working, especially in equatorial regions. The high temperature results in a decrease in the photoelectric conversion efficiency. High temperatures cause both short-term and long-term losses. This leads to the emergence of a variety of cooling systems, with a considerable amount of recent research was done on enhancing them.

In general, a solar photovoltaic panel system is coupled with a cooling system in order to prevent the overheating of the photovoltaic modules, e.g. solar photovoltaic panels. Various cooling methods were devised for use with a solar photovoltaic system, each with their own drawbacks that need to be considered.

One of the cooling strategies of the photovoltaic panels is described in U.S. Pat. No. 9,236,515 B2, which describes the use of a coolant fluid, which circulates in a heat exchanger to recuperate the heat from the photovoltaic panels. This system requires increased system design complexity, e.g. coolant loops, piping, valves etc. Besides, the cooling efficiency is very low.

Another approach for addressing the problem via an open loop system is described in US 2014/0299174, which describes the working principle to pump the water directly from a lake or a river, pass it through a system of nozzles and spray the underside of the solar panle module directly. In this open loop design, once the water is sprayed onto the photovoltaic panels, it drips back onto the ground and is lost. Further, it requires solutions for obtaining and providing water from the lake or river to the solar panels.

Another system which is being explored recently is the active water spraying system, which usually uses a normal water nozzle for spraying cooling fluid directly onto the back side of the solar panel, as described in U.S. Pat. No. 10,050,584 B2. This system also requires high design complexity. Further, it is hard to achieve a uniform and even distribution of the fluid on the photovaltaic by applying water spray.

The foregoing attempts to address the problem of heating of photovoltaic panels have their drawbacks which have to be considered. There has been a continuing need for a solar photovoltaic panel cooling system that reduces cost and complexity and which has great cooling effiency and low use of water.

SUMMARY OF THE INVENTION

Therefore, it is an object of the present invention to provide a solution for the drawbacks of the traditional solutions. In particular, it is the object of the present invention to provide a solar photovoltaics panel fog/mist cooling system which achieves faster and more efficient cooling of the solar photovoltaic panels and lower usage of water.

The present invention involves a solar photovoltaics panel fog/mist cooling system, comprising at least one solar photovoltaic panel, and at least one nozzle arranged at a back side of the at least one solar photovoltaic panel and configured to generate a fog/mist applied onto the back side of the at least one solar photovoltaic panel.

Unlike applying a normal nozzle as in the prior art technologies, which generates a water spray, the nozzle used in the present invention is specifically designed to generate a fog/mist, which is a phenomenon caused by small droplets of water suspended in the air. Because of this characteristic of a fog/mist, droplets of the fog/mist, unlike water spray, will not fall immediately through the air, but will suspend finely in the air. Droplets of the fog/mist are able to cover a larger surface area. The evaporation and cooling effectiveness can be enhanced. Further, according to the present application, at least one nozzle is arranged at a back side of the at least one solar photovoltaic panel. Thus, the fog/mist generated by the nozzles can be applied towards the back side of the at least one solar photovoltaic panel to achieve a more efficient cooling of the solar photovoltaic panel.

In another embodiment of the present invention, the system further comprises phase-change materials coupled to the back side of the at least one solar photovoltaic panel, and wherein the fog/mist generated by the at least one nozzle is applied directly onto a back side of the phase-change materials.

In another embodiment of the present invention, the system further comprises a husk mesh formed by husks, wherein the husk mesh is directly attached to the phase-change materials, and wherein the fog/mist generated by the at least one nozzle is applied directly onto the back side of the husk mesh and is absorbed by the husk mesh.

In another embodiment of the present invention, the system comprises a husk mesh formed by husks, wherein the husk mesh is directly coupled to the back side of the at least one solar photovoltaic panel, and wherein the fog/mist generated by the at least one nozzle is applied directly onto the back side of the husk mesh and is absorbed by the husk mesh.

In another embodiment of the present invention, the at least one nozzle is a small orifice nozzle or an impingement nozzle.

In another embodiment of the present invention, the system further comprises a distribution system including a manifold to distribute a fluid to the at least one nozzle, wherein the at least one nozzle is coupled to the manifold.

In another embodiment of the present invention, the at least one nozzle is statically configured to provide a single constant fog/mist spray pattern.

In another embodiment of the present invention, the at least one nozzle is dynamically configured to oscillate, rotate or move.

In another embodiment of the present invention, the at least one nozzle is driven by a motor and is controlled depending on a measured temperature of the at least one photovoltaic panel.

In another embodiment of the present invention, the distribution system is designed that the fog/mist generated by the at least one nozzle covers a whole surface of the back side of the at least one solar photovoltaic panel uniformly.

In another embodiment of the present invention, the system further comprises a closed loop system comprising a tank containing a fluid, and a pump configured to pump the fluid to the distribution system.

In another embodiment of the present invention, the fluid is water or a nanofluid.

In another embodiment of the present invention, a residue fluid collected from the at least one solar photovoltaic panel is returned to the tank and recirculated with the closed loop system.

In another embodiment of the present invention, the closed loop system further comprises a first filter arranged at an upstream side of the tank to filter the residue fluid collected from the at least one solar photovoltaic panel before being returned to the tank.

In another embodiment of the present invention, the closed loop system further comprises a second filter arranged at a downstream side of the tank to filter the water from the tank.

In another embodiment of the present invention, the closed loop system further comprises a third filter arranged at a downstream side of the pump to filter the fluid before being delivered to the distribution system.

In another embodiment of the present invention, the closed loop system further comprises a heat exchanger arranged at an upstream side of the tank.

In another embodiment of the present invention, a residue fluid collected from the at least one solar photovoltaic panel is delivered to the heat exchanger for heating purpose.

In another embodiment of the present invention, the residue fluid after passing through the heat exchanger is delivered to the tank and recirculated with the closed loop system.

In another embodiment of the present invention, the heat exchanger is a tank coil heat exchanger.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

The aspects of a solar photovoltaics panel fog/mist cooling system will be described in conjunction with FIGS. 1-9. The main design of the solar photovoltaics panel fog/mist cooling system according to the present invention fully considers reduced and uniform module temperatures, and minimal power and resource consumption. In the detailed description, reference is made to the accompanying figures, which form a part hereof, and in which is shown by way of illustration specific embodiments in which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

Figure 1:
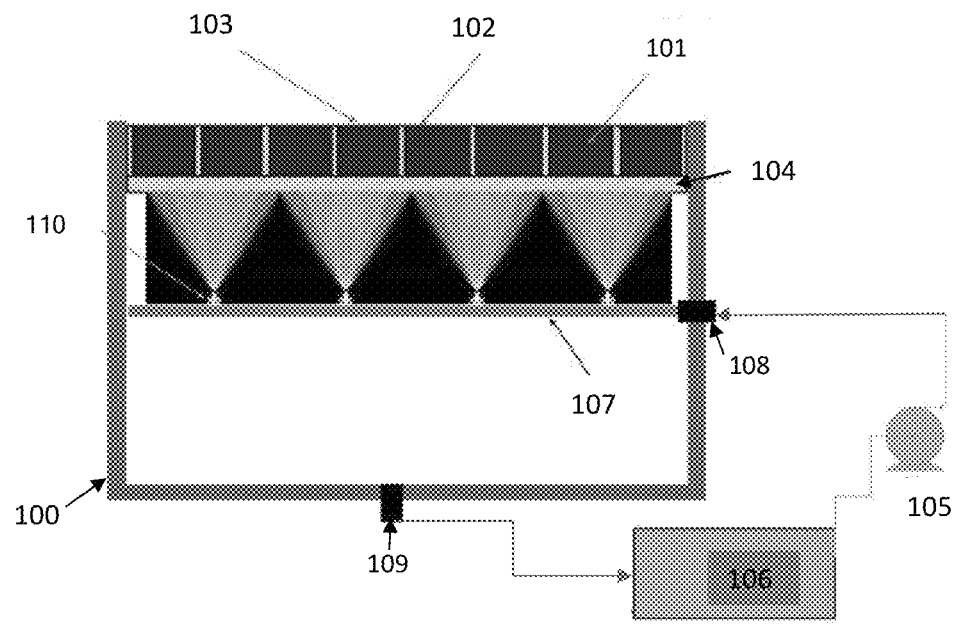
FIG. 1 illustrates a schematic diagram of a solar photovoltaics panel fog/mist cooling system in accordance with the present invention.

FIG. 1 is a schematic diagram illustrating a solar photovoltaics panel fog/mist cooling system according to an embodiment of the present invention. As shown in FIG. 1, a plurality of solar photovoltaic panels 101 for absorbing and converting sunlight into electricity are connected with each other and mounted within a support frame 100. A glass cover 102 is mounted on an upper surface of the photovoltaic panels 101 and is used for transmitting as much sunlight as possible into the solar photovoltaic panels 101. A solar irradiance 103 refers to the output energy of the photovoltaic panels 101.

In the embodiment according to the present invention, a plurality of nozzles 110 are provided for cooling purpose. The nozzles 110 are specially designed nozzles that force fluid to flow out in a high pressure state which creates a fog/mist that effectively absorbs heat and cools the surface of the photovoltaic panels 101. The nozzles 110 are selected from small orifice nozzles and impingement nozzles. The structure and work principles of the specially designed nozzles 110 will be described below in detail according to the FIGS. 7A-7C.

As shown in the FIG. 1, the nozzles 110 are arranged at the back side of the solar photovoltaic panels 101 and are coupled with a distribution system 107. The solar photovoltaic panel fog/mist cooling system includes an inlet 108 that coupled to a manifold of the distribution system 107 which distributes the cooling fluid to the nozzles 110. The nozzles 110 are configured to generate a fog/mist towards the back side of the solar photovoltaic panels 101. The distribution system 107 is arranged in the support frame 100 under the solar photovoltaic panels. The structure of the distribution system 107 in accordance with the present invention will be described below in detail according to the FIG. 5.

As shown in the FIG. 1, a water supply system comprising a tank 106 and a pump 105 is provided and connected with the support frame 100 of the solar photovoltaic panels 101 via the inlet 108. The tank 106, the pump 105 and the support frame 100 are in fluid communication with one another and form a closed loop system. The tank 106 contains a cooling fluid. The cooling fluid can be water or a nanofluid. A nanofluid is a fluid containing nanometer-sized particles, called nanoparticles. These fluids are engineered colloidal suspensions of nanoparticles in a base fluid. Nanofluids can provide an enhanced thermal conductivity. By applying nanofluids in the closed loop system, better thermal and electrical enhancement can be achieved.

The water supply system according to the FIG. 1 of the present invention is a closed loop system which circulates the cooling fluid via the pump 105 towards the distribution system 107 and nozzles 110 through the inlet 108. The pump 105 only requires a small fraction of the output energy of the solar photovoltaic panels 101, which is sufficient for circulating the cooling fluid in the solar photovoltaic fog/mist cooling system. The distribution system 107 distributes the cooling fluid among the nozzles 110. Then the nozzles 110 generate a fog or mist applied onto the back side of the solar photovoltaic panels 101. According to the present invention, the numbers, the types, the positions of the nozzles 110 are configured to ensure that the generated fog/mist covers the complete surface of the back side of the solar photovoltaic panels 101 and distributes uniformly on the surface of the of the back side of the solar photovoltaic panels 101. Hence, a better cooling performance can be achieved. By applying a fog/mist generated by the specifically designed nozzles 110 directly to the back side of the solar photovoltaic panels 101, a more efficient cooling of the solar photovaltic panels can be achieved by applying a very simple design, without any water flowing circuit mounted on the solar photovoltaic panels.

During the cooling, a residue fluid will be produced on the surface of the back side of the solar photovoltaic panels 101. The closed loop system according to the present invention is designed that the residue fluid leaving the solar photovoltaic panels 101 is collected and returned to the tank 106 through an outlet 109 at the support frame 100 and recirculated within the closed loop system. The closed loop system can further comprise a filter arranged at an upstream side of the tank 106 and configured to filter the residue fluid leaving the solar photovoltaic panels 101 before being returned to the tank 106. The residue fluid will go through the filter, where the residue fluid is filtered before being sent back to the tank 106. The clogging of the nozzles due to bigger particles can be avoided.

A further filter can be arranged at a downstream side of the tank 106 to filter the water from the tank 106. Another filter can also be arranged at a downstream side of the pump 105 to filter the fluid before being delivered to the distribution system. The clogging of the nozzles can therefore further be avoided.

If the residue fluid collected from the surface of the solar photovoltaic panels 101 has a higher temperature, then a heat exchanger is provided in the closed loop system. The residue fluid with high temperature goes through the heat exchanger for heating purpose, which will be described in FIG. 8 in detail.

As shown in the FIG. 1, the solar photovoltaic panels 101 can be provided with a Tedlar sheet 104 on the back side. Tedlar is the brand name of the US-American chemical company DuPont and refers to Polyvinyl fluoride (PVF). Tedlar sheet is therefore used as a backsheet of solar photovoltaic panels to enhance the longevity of the panels.

The cooling system according to the present invention is a low cost and low water usage system in nature. Further, it has the ability to cover and cool a much larger surface area as compared to the water jet used in the prior technologies.

Figure 2:
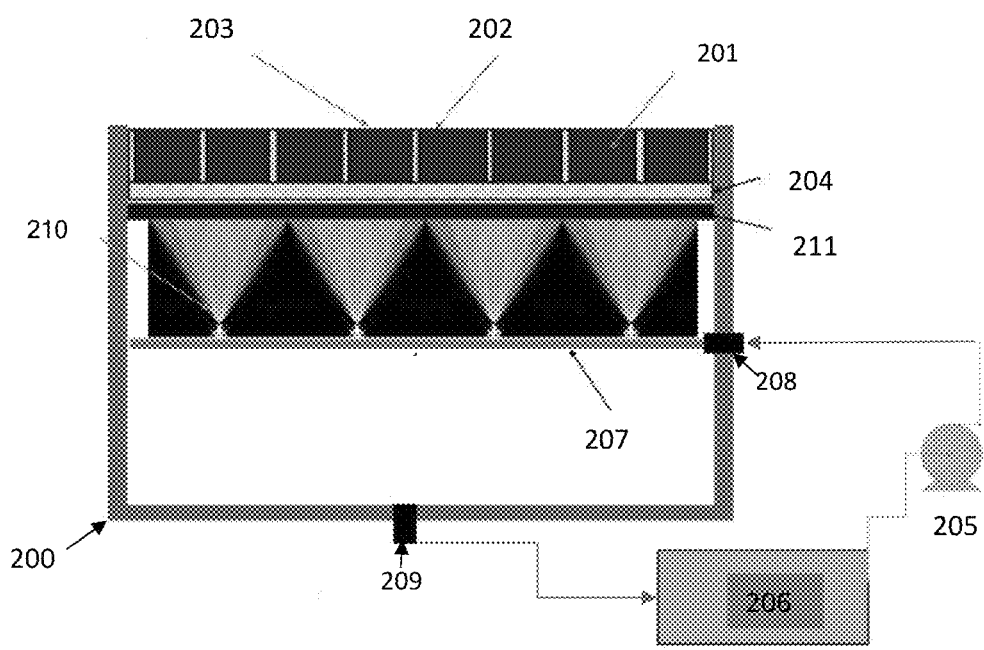
FIG. 2 illustrates a schematic diagram of a solar photovoltaics panel fog/mist cooling system provided with phase-change materials in accordance with the present invention.

In accordance with another embodiment of the present invention, and as shown in FIG. 2, a plurality of solar photovoltaic panels 201 are connected with each other and mounted with a support frame 200. A glass cover 202 is mounted on an upper surface of the photovoltaic panels 201. The solar photovoltaic panels 201 can be provided with a Tedlar sheet 204 on the back side.

Further, according to the embodiment, as shown in FIG. 2 of the present invention, phase-change materials 211 are provided and coupled to the solar photovoltaic panels 201. The phase-change materials 211 are filled within a closed box. Once the phase-change materials are filled within the box, the box will be closed tightly. As shown in the FIG. 2, the phase-change materials 211 are coupled to the Tedlar sheet 204 of the solar photovoltaic panels 201. If no Tedlar sheet is provided, the phase-change materials are attached directly to the back side of the photovoltaic panels 201 in the closed box. The phase-change materials 211 are arranged between the back side of the solar photovoltaic panels 201 and the plurality of nozzles 210.

A phase change material (PCM) is a substance with a high heat of fusion which, melting and solidifying at a certain temperature, is capable of storing and releasing large amounts of energy. Heat is absorbed or released when the material changes from solid to liquid and vice versa. Adding phase-change materials 211 on the back side of the solar photovoltaic panels 201 can further lower the panel's operating temperature and improve the performance of solar photovoltaic panels 201.

Other modules/elements in the system according to FIG. 2 of the present invention have the similar structure and similar work principle of that according to the FIG. 1 of the present invention.

In the embodiment of the present invention according to FIG. 2, the specifically designed nozzles 210 generate a fog or mist applied onto the surface of the phase-change materials 211. The generated fog/mist covers the complete surface of the phase-change materials 211 and distributes uniformly on the whole surface. A residue fluid leaving the surface of the phase-change materials 211 is collected and returned to the tank 206 and recirculated within the closed loop system. The water supply system in the FIG. 2 is a similar closed loop system as the closed loop system according to the embodiment of the present invention according to the FIG. 1.

Figure 3:
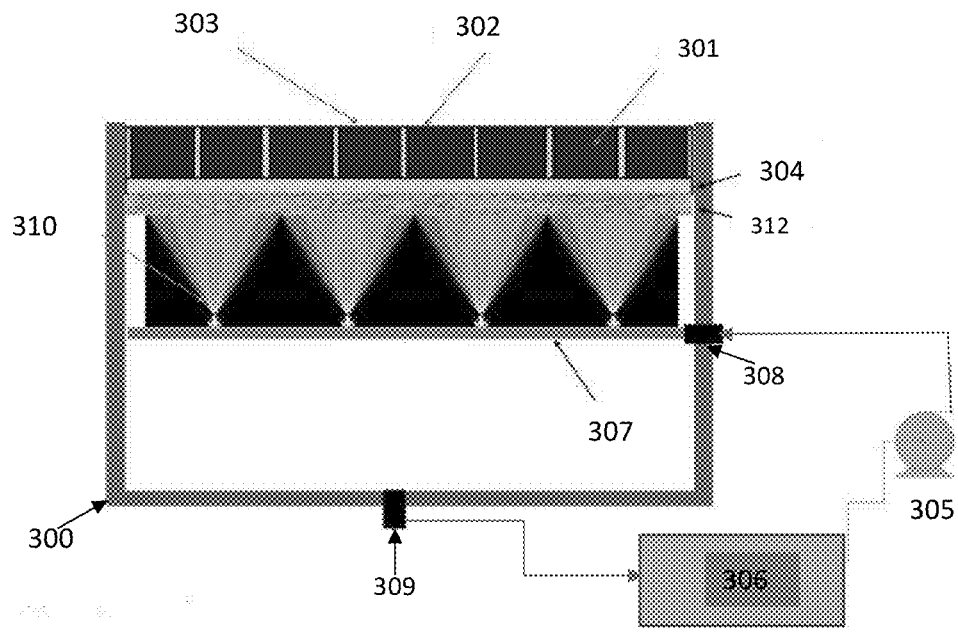
FIG. 3 illustrates a schematic diagram of a solar photovoltaics panel fog/mist cooling system provided with a husk mesh in accordance with the present invention.

In accordance with another embodiment of the present invention, and as shown in FIG. 3, a plurality of solar photovoltaic panels 301 are connected with each other and mounted with a support frame 300. A glass cover 302 is mounted on an upper surface of the photovoltaic panels 301. The solar photovoltaic panels 301 can be provided with a Tedlar sheet 304 on the back side.

Further, according to the embodiment as shown in FIG. 3 of the present invention, a husk mesh 312 formed by husks is provided and coupled to the solar photovoltaic panels 301. The husks can be palm tree husks. As shown in the FIG. 3, the husk mesh 312 is coupled to the Tedlar sheet 304 of the solar photovoltaic panels 301. If no Tedlar sheet is provided, the husk mesh is fixed and attached directly to the back side of the photovoltaic panels 301. The husk mesh 312 is arranged between the back side of the solar photovoltaic panels 301 and the plurality of nozzles 310.

Other modules/elements in the system according to FIG. 3 of the present invention have the similar structure and similar work principle of that according to the FIG. 1 of the present invention.

In the embodiment of the present invention according to FIG. 3, the specifically designed nozzles 310 generate a fog or mist applied onto the surface of the husk mesh 312. The generated fog/mist covers the complete surface of the husk mesh 312 and distributes uniformly on the whole surface. The husk mesh 312 can absorb the fog/mist generated by the nozzles 310. A residue fluid leaving husk mesh 312 is collected and returned to the tank 306 and recirculated within the closed loop system. The water supply system in the FIG. 3 is a similar closed loop system as the closed loop system according to the embodiment of the present invention according to the FIG. 1.

Figure 4:
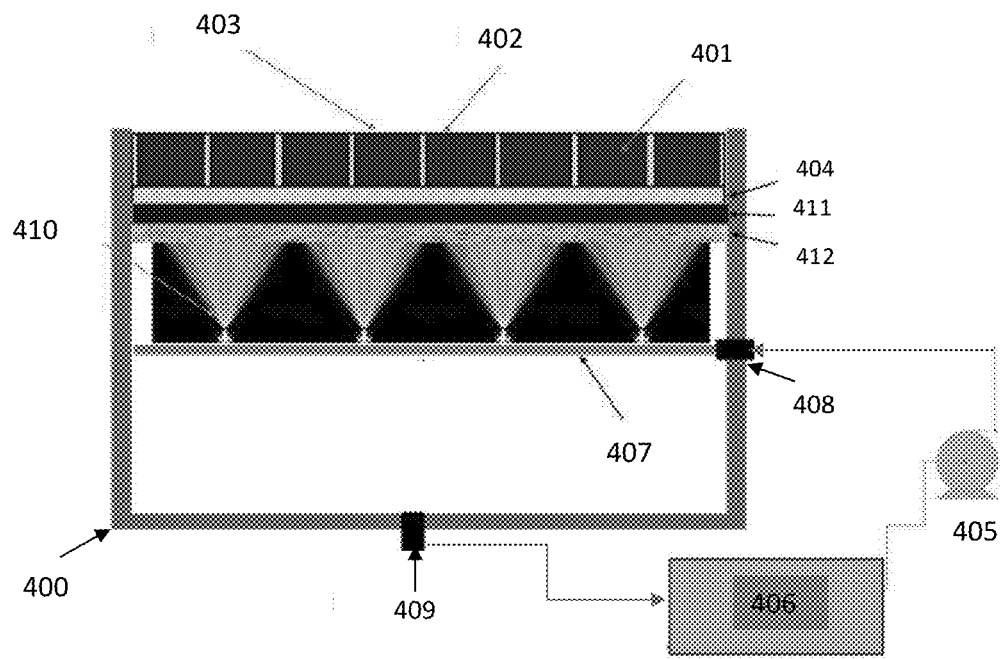
FIG. 4 illustrates a schematic diagram of a solar photovoltaics panel fog/mist cooling system provided with phase-change materials and a husk mesh in accordance with the present invention.

In accordance with another embodiment of the present invention, and as shown in FIG. 4, a plurality of solar photovoltaic panels 401 are connected with each other and mounted with a support frame 400. A glass cover 402 is mounted on an upper surface of the photovoltaic panels 401. The solar photovoltaic panels 401 can be provided with a Tedlar sheet 404 on the back side.

Further, according to the embodiment as shown in FIG. 4 of the present invention, both of phase-change materials 411 and a husk mesh 412 are provided. Similar as illustrated in the FIG. 2 of the present invention, the phase-change materials 411 are filled within a closed box. Once the phase-change materials are filled within the box, the box will be closed tightly. As shown in the FIG. 4, the phase-change materials 411 are coupled to the Tedlar sheet 404 of the solar photovoltaic panels 401. If no Tedlar sheet is provided, the phase-change materials 411 are attached directly to the back side of the photovoltaic panels 401 in the closed box. Further, the husk mesh 412 is attached to the back side of the box of the phase-change materials 411. The husk mesh 412 will be sprayed by fog/mist generated by the specially designed nozzles 410.

Other modules/elements in the system according to FIG. 4 of the present invention have the similar structure and similar work principle of that according to the FIG. 1 of the present invention.

In the embodiment of the present invention according to FIG. 4, the specifically designed nozzles 410 generate a fog or mist applied onto the surface of the husk mesh 412. The generated fog/mist covers the complete surface of the husk mesh 412 and distributes uniformly on the whole surface. The husk mesh 412 can absorb the fog/mist generated by the nozzles 410. A residue fluid leaving husk mesh 412 is collected and returned to the tank 406 and recirculated within the closed loop system. The water supply system in the FIG. 4 is a similar closed loop system as the closed loop system according to the embodiment of the present invention according to the FIG. 1.

Figure 5A:
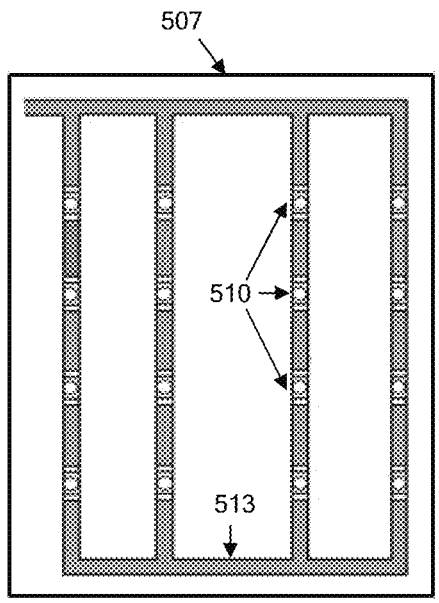
FIG. 5 illustrates a schematic diagram of a distribution system in accordance with the present invention.
Figure 5B:
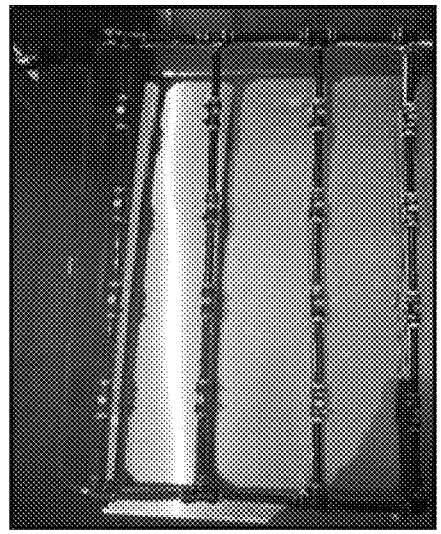

FIG. 5 illustrates a schematic diagram of a distribution system 507 as in accordance with the present invention. The distribution system 507 comprises a manifold 513 on which the specifically designed nozzles according to the present invention are arranged. The nozzles can be all small orifice nozzles, or all impingement nozzles, or a combination of small orifice nozzles and impingement nozzles. The distribution system 507 is in fluid communication with the closed loop system as illustrated in FIG. 1-FIG. 4. The manifold distributes the cooling fluid pumped from the pump to the nozzles 510. As an example shown in the FIG. 5A of the present invention, the manifold 513 of the distribution system 507 has four columns of nozzles, with four nozzles being arranged on each column.

In the present application, the nozzles 510 can be designed according to either a static approach or a dynamic approach. According to the static approach, the nozzles 510 are fixed on the manifold 513 as shown in the FIG. 5. Each nozzle provides a single constant fog/mist spray pattern. According to the dynamic approach, only four nozzles will be placed in a line on the manifold, wherein the nozzles are dynamically configured to oscillate, rotate or move. The movement of the nozzles will be driven with help of motors that are temperature controlled. Therefore, in this approach, the temperature of the solar photovoltaic panels will be monitored. If the temperature is high, the motors and the nozzles will be signaled to be operated until the temperature of the photovoltaic panels is brought down to the desired levels.

The distribution system according to the present invention is designed to ensure that the fog/mist generated by the nozzles covers a whole surface of the back side of the solar photovoltaic panels uniformly. The exact number of the nozzles and their positions for a best cooling effect depend on different sizes of the solar photovoltaic panels. Furthermore, dust and other very small particles within the fluid circulated in the closed loop system could easily block the orifice of the nozzles, since the nozzles have very small diameter. Therefore, two different types of filters should be provided in the closed loop system of the cooling system, one after taking water from the tank, and the other one after pumping it into the mist system, to ensure that no particles penetrate through.

Figure 6:
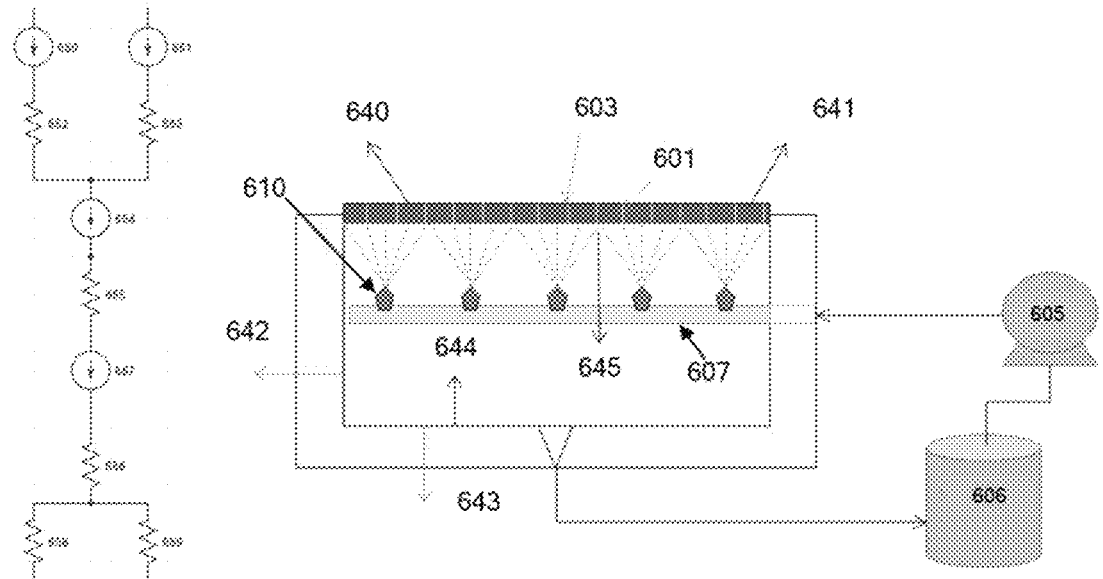
FIG. 6 illustrates a schematic diagram of a solar photovoltaics panel fog/mist cooling system including a thermal resistance circuit in accordance with the present invention.

FIG. 6 illustrates a schematic diagram of a solar photovoltaics panel fog/mist cooling system including a thermal resistance circuit in accordance with the present invention. The right schematic diagram of the FIG. 6 shows the flow of circulation through the cooling system, wherein a working fluid, which is water or nanofluid will be pumped via a pump 605 from a tank 606 to the distribution system 607, where the nozzles 610 are placed. 603 represents incident solar radiation. The nozzles 610 generate the fog/mist uniformly over the whole surface of the back side of the solar photovoltaic panels 601. The fluid will be collected back to the tank 606 after filtering.

In the right schematic diagram, reference number 640 refers to a radiation heat exchange between photovoltaic panels and the sky. Reference number 641 refers to a convection heat transfer between photovoltaic panels 641 and surrounding air. Reference number 644 refers to a convection heat transfer between the back side of the fog/mist cooling system and the fluid inside fog/mist cooling system. Reference number 645 refers to a convection heat transfer between the photovoltaic panels 601 and the fluid inside the fog/mist cooling system. The reference number 642 refers to the edge side heat loss. The reference number 643 refers to the bottom side heat loss.

The left schematic diagram of FIG. 6 shows the thermal resistance network through the cooling system. There are two thermal resistances between the photovoltaic panel and the surrounding. One thermal resistance 652 refers to $R_{r,\ PV-a}$ by convection with the ambient air and another thermal resistance 653 refers to $R_{c,\ PV-a}$ by radiation with the sky. From the backside of the photovoltaic panels, there is one thermal resistance 655, referring to $R_{c,\ PV-f}$ by convection with the cooling fluid in the fog/mist cooling system. There is also another thermal resistance on the bottom of the cooling system 656, referring to $R_{c,\,b\text{-}f}$, which is mainly by conduction through the cover material. Reference number 650 refers to the equivalent blackbody sky temperature $T_{sky}$. Reference number 651 refers to a temperature of air $T_a$. Reference number 654 refers to a temperature of the photovoltaic panels $T_{PV}$. Reference number 657 refers to a temperature of the cooling fluid in the fog/mist cooling system $T_f$. Reference numbers 658 and 659 refer to radiation and convection between the backside of the photovoltaic panels and the surrounding. For the radiation heat transfer between the photovoltaic panel and the surrounding air, the temperature of surrounding air shoud be set to the equivalent blackbody sky temperature $T_{sky}$. This equivalent backbody sky temperature accounts for the facts that the atmosphere is not a uniform temperature and the atmosphere radiates only in certain wavelength bands. As shown in the FIG. 6, the input temperature of the system is the cold temperature coming from the pump 605. The output temperature of the system is the temperature of the hot water collected at the end of the cooling process.

The specific designs of the nozzles applied in the present invention are illustrated in the FIGS. 7A-7D in detail.

Figure 7A:
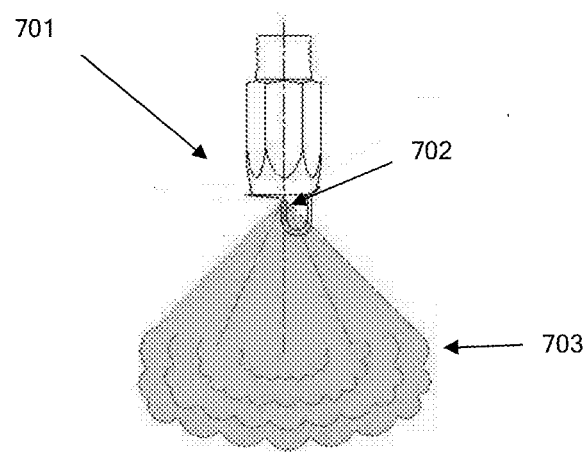
FIG. 7A illustrates a schematic diagram of an impingement nozzle in accordance with the present invention.
Figure 7B:
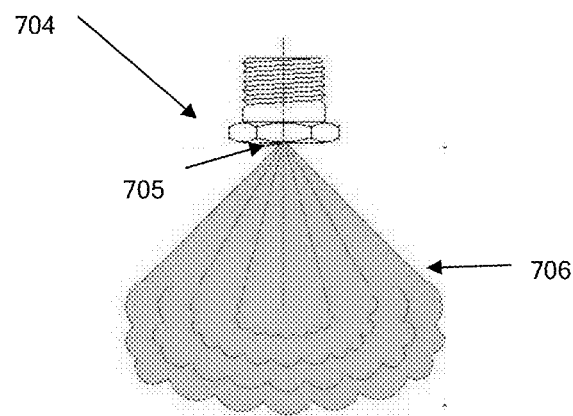
FIG. 7B illustrates a schematic diagram of a small orifice nozzle in accordance with the present invention.

The specifically designed nozzles applied in the present invention are impingement nozzles and/or small orifice nozzles. FIG. 7A shows a form of an impingement nozzle 701 and FIG. 7B shows a form of a small orifice nozzle 704. The specifically designed nozzles have the work mechanism that fluid is pumped through tubes or pipes to the specifically designed nozzles and that the specifically designed nozzles force the water out in micro-scale sized droplets. These water droplets are small enough to instantly flash-evaporate. This flash-evaporate reduces the temperature of surrounding material e.g. the surface of the back side of the solar photovoltaic panels according to the present invention. Fog/Mist cooling system applying the specifically designed nozzles are economical due to the greatly reduced amount of the fluid used and its ability to induce cooling with making the solar panels too wet.

Theoretically, smaller droplets cover a larger surface area. The evaporation and cooling effectiveness can be enhanced.

Both types of impingement nozzles and small orifice nozzle have different shapes and operate at different pressures, which in turn allows them to produce distinct spray characteristics and in turn changes in costs and effectiveness. The NFPA 750 Standards also introduce three categories to differentiate water mist generation technologies, sorted by pressure regions, namely low, intermediate, and high pressure systems. Low pressure systems run at 12 bar pressures or less. Intermediate pressure systems run within the range from 12 to 34 bar. High pressure systems run at 34 bar pressures or above.

The structure and work principle of an impingement nozzle 701 is described in detail based on the FIG. 7A of the present invention. The impingement nozzles use the traditional sprinklers and nozzles used in spray systems and have an orifice with a large diameter. This means that small droplets can be produced with high velocities. A deflector is also utilized to break up the fluid jet into droplets, where the velocity of the water jet and the deflector shape are the main factors governing the droplet size and distribution in the fog/mist, as well as the cone angle and spray momentum.

According to the present application, the specifically designed impingement nozzles use operating pressures spanning both low and intermediate pressures. The generated mist will have Sauter mean droplet size of between 30-60 microns.

As shown in the FIG. 7A of the present invention, fluid is ejected from the nozzle circular orifice, which initially produces a solid stream of fluid. Then the fluid impinges upon a pin 702 after exiting from the orifice. The pin 702 breaks up the spray into fine homogeneous fog/mist. After this impact, a full cone pattern 703 is formed which rapidly breaks down into a fog/mist. The specifically designed impingement nozzles according to the present invention can be operated under a pressure of minimum 4 bar and with a flow rate varying between 0.043 l/min to 5.35 l/min to generate a cone-shaped spray pattern fog with a spray angle of 90°. A dimension of a male connection is ⅛" NPT or ¼" NPT.

The structure and work principle of a small orifice nozzle 704 is described in detail based on the FIG. 7B of the present invention. The small orifice nozzle belongs to the type of pressure jet nozzles consisting of small diameter orifices, where high velocity water leaving the opening of the nozzle becomes unstable and breaks up through the swirl chambers used. As shown in the FIG. 7B, liquid is forced through a very small orifice 705 at a high pressure breaking it up into small droplets. After exiting from the orifice a full cone pattern 706 is initially formed which rapidly breaks a homogenous fog/mist. Small orifice nozzles allow for the usage of multi-nozzle heads at low pressures, which provide larger cone angles.

Small orifice nozzles have the ability to produce various features like fine droplets, wide spray angles, and good spray projection. It is found that the size and distribution of the droplets in the small orifice nozzles depends on the operating pressure, as pressure increase the droplets get finer. Droplets momentum also depends on the operating pressure, as pressure increase the momentum increases. However, the operating pressure should not exceed an upper limit, which means any point beyond the limit affects the distribution negatively. The specifically designed impingement nozzles according to the present invention can be operated under a pressure of minimum 7 bar and with a flow rate varying between 0.043 l/min to 5.35 l/min to generate a cone-shaped spray pattern fog with a spray angle of 70°. The dimension of a male connection is ⅛" or ¼" BSP or NPT or ⅜"-24 UNF pipe size.

The droplet size of the fog/mist generated by the spefically designed nozzles according to the present invention depends on the structure of the atomizer, intensity of the liquids energy, liquid surface tension and density. The size of the atomized droplets is not uniform. Therefore, the average droplets size becomes an important factor. A Sauter Mean Diameter (SMD) is the most commonly used term refering to the droplet volume/surface area ration. It is often shown as D32, μm (micrometer) unit, wherein 1 μm is equal to $10^{-3}$ mm. The fog/mist generated by the spefically designed nozzles according to the present invention will have a Sauter mean droplet size of between 30 and 60 micrometer.

Figures 7C, 7D:
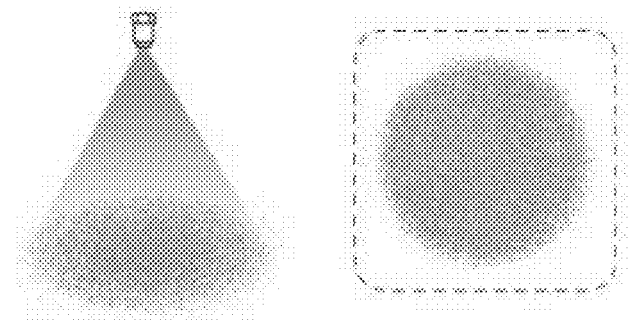
FIG. 7C illustrates a fog/mist spray pattern of the nozzle in accordance with the present invention.
FIG. 7D illustrates the distribution of the fog/mist generated by the nozzle in accordance with the present invention.

FIG. 7C illustrates a full cone spray pattern having a conical pattern generated by the inventive specifically designed nozzles according to the present invention. As can be seen in the FIG. 7D, the full cone spray pattern provides a round impact area and uniform and even distribution.

Figure 8:
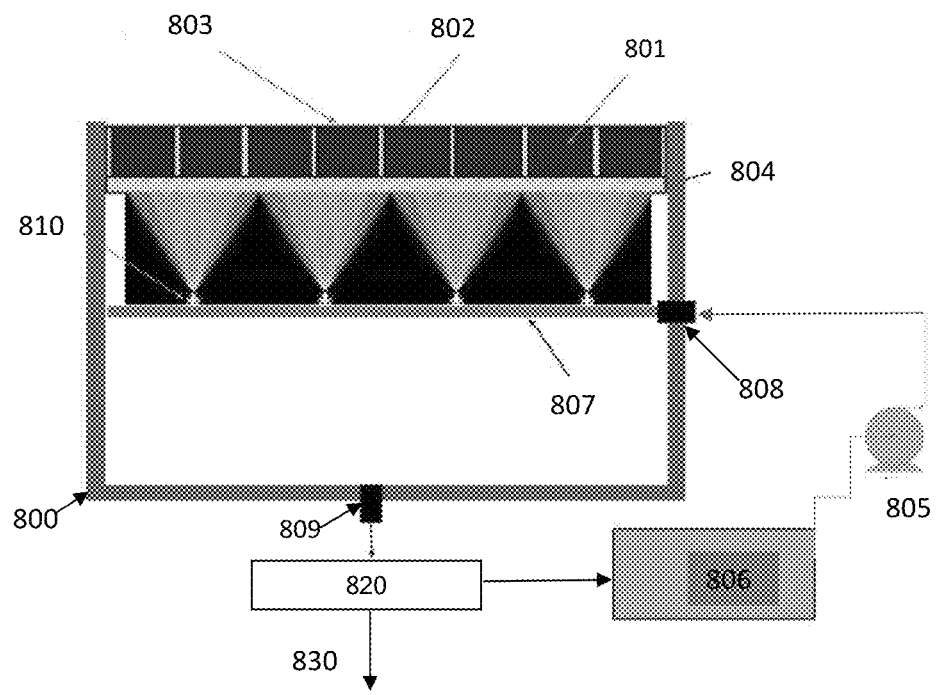
FIG. 8 illustrates a schematic diagram of a solar photovoltaics panel fog/mist cooling system provided with a heat exchanger in accordance with the present invention.

FIG. 8 illustrates a schematic diagram of a solar photovoltaics panel fog/mist cooling system provided with a heat exchanger in accordance with the present invention. The modules/elements in the cooling system according to FIG. 8 of the present invention have a similar structure and work principle of that according to the FIG. 1 of the present invention. Moreover, as shown in the FIG. 8, a heat exchanger 820 is provided at an upstream side of the tank 806. A residue fluid collected from the solar photovoltaic panes 801 usually has high temperature. Therefore, the residue fluid can be collected and delivered through an outlet 809 to the heat exchanger 820 for heating purpose. The heat exchanger 820 according to the present invention is a tank coil heat exchanger, in which a fluid is circulated inside the coil. The hot residue fluid collected from the solar photovoltaics panel fog/mist cooling system is delivered into the heat exchanger 820 and will exchange the heat with the fluid circulated inside the coil of the heat exchanger. A fluid 830 heated within the heat exchanger 820 is delivered to other devices/units for heating purpose. The residue fluid after passing through the heat exchanger has a low temperature and is delivered to the tank 806 to be recirculated in the closed loop system.

The systems according to FIG. 2-FIG. 4 can also be provided with a heat exchanger similar to the heat exchanger 820 in the FIG. 8 of the present invention.

Figure 9:
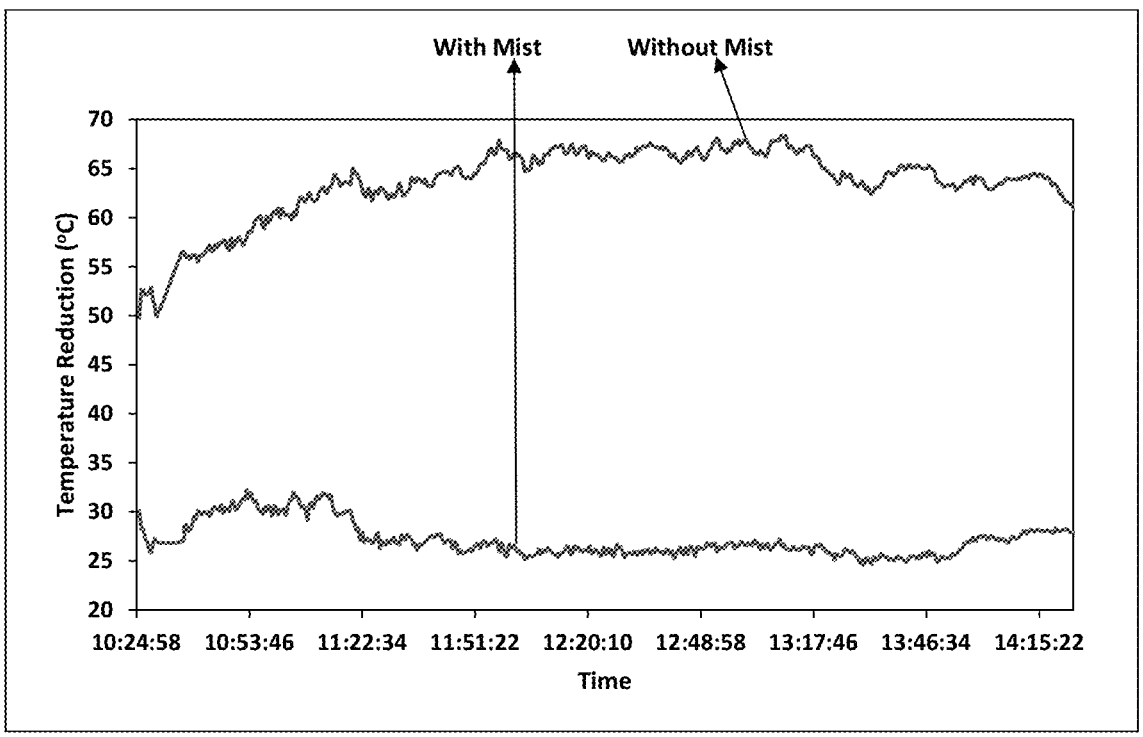
FIG. 9 shows a comparison of the bottom temperature development in time between the solar photovoltaic panels with and without the fog/mist cooling system in accordance with the present invention.

FIG. 9 of the present invention shows a comparison of the bottom temperature development in time between the solar photovoltaic panels with and without the inventive solar photovoltaics panel fog/mist cooling system. The blue line illustrates the bottom temperature reduction in time measured for a system with a fog/mist cooling system according to the present invention, whereas the red line illustrates the bottom temperature reduction development in time measured for a system without a fog/mist cooling system. The bottom temperature refers to the temperature measured on the back side surface of the solar photovoltaic panels. The experimental results show that it is possible to decrease panel temperature to a temperature below 35° C. or even below 30° C. in the case of applying the fog/mist cooling system according to the present invention. It can be observed that with the inventive fog/mist cooling system, the solar photovoltaic panels can be operated under a low temperature constantly.

The main advantages accompanying the present invention is that the solar photovoltaic panels can be cooled in a better way and can be operated at lower and uniform temperate with higher performance constantly. For cooling down the solar photovoltaics panels less water consumption is required due to the use of a closed loop system. More electricity production and better control of the system can be achieved. Moreover, the cooling efficiency of the system is unaffected by the external environmental conditions, e.g. the temperature of the solar photovoltaic panel, the amount of dust or particles to be removed, the angle through which sunlight strikes at the solar photovoltaic panels.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. A solar photovoltaic panel fog/mist cooling system, comprising at least one solar photovoltaic panel, and at least one nozzle arranged at a back side of the at least one solar photovoltaic panel and configured to generate a fog/mist applied onto the back side of the at least one solar photovoltaic panel, wherein the at least one nozzle is an impingement nozzle, wherein fluid ejected from an orifice of the at least one nozzle impinges upon a pin after exiting from the orifice, thereby breaking the ejected fluid into a conical fine homogeneous fog/mist.

2. The system according to the claim 1, wherein the system further comprises phase-change materials coupled to the back side of the at least one solar photovoltaic panel, and wherein the fog/mist generated by the at least one nozzle is applied directly onto a back side of the phase-change materials.

3. The system according to the claim 1, wherein the system further comprises phase-change materials coupled to the back side of the at least one solar photovoltaic panel and a husk mesh formed by husks, wherein the husk mesh is directly attached to the phase-change materials, and wherein the fog/mist generated by the at least one nozzle is applied directly onto the back side of the husk mesh and is absorbed by the husk mesh.

4. The system according to the claim 1, wherein the system comprises a husk mesh formed by husks, wherein the husk mesh is directly coupled to the back side of the at least one solar photovoltaic panel, and wherein the fog/mist generated by the at least one nozzle is applied directly onto the back side of the husk mesh and is absorbed by the husk mesh.

5. The system according to the claim 1, wherein the system further comprises a distribution system including a manifold to distribute a fluid to the at least one nozzle, wherein the at least one nozzle is coupled to the manifold.

6. The system according to the claim 5, wherein the at least one nozzle is statically configured to provide a single constant fog/mist spray pattern.

7. The system according to the claim 5, wherein the at least one nozzle is dynamically configured to oscillate, rotate or move.

8. The system according to the claim 7, wherein the at least one nozzle is driven by a motor and is controlled depending on a measured temperature of the at least one photovoltaic panel.

9. The system according to the claim 5, wherein the distribution system is designed that the fog/mist generated by the at least one nozzle covers a whole surface of the back side of the at least one solar photovoltaic panel uniformly.

10. The system according to the claim 1, wherein the system further comprises a closed loop system comprising a tank containing a fluid, and a pump configured to pump the fluid to the distribution system.

11. The system according to the claim 10, wherein the fluid is water or a nanofluid.

12. The system according to the claim 10, wherein a residue fluid collected from the at least one solar photovoltaic panel is returned to the tank and recirculated with the closed loop system.

13. The system according to the claim 10, wherein the closed loop system further comprises a first filter arranged at an upstream side of the tank to filter the residue fluid collected from the at least one solar photovoltaic panel before being returned to the tank.

14. The system according to the claim 13, wherein the closed loop system further comprises a second filter arranged at a downstream side of the tank to filter the water from the tank.

15. The system according to the claim 14, wherein the closed loop system further comprises a third filter arranged at a downstream side of the pump to filter the fluid before being delivered to the distribution system.

16. The system according to the claim 10, wherein the closed loop system further comprises a heat exchanger arranged at an upstream side of the tank.

17. The system according to the claim 16, wherein a residue fluid collected from the at least one solar photovoltaic panel is delivered to the heat exchanger for heating purpose.

18. The system according to the claim 16, wherein the residue fluid after passing through the heat exchanger is delivered to the tank and recirculated with the closed loop system.

19. The system according to the claim 16, wherein the heat exchanger is a tank coil heat exchanger.

20. The system according to the claim 1, wherein the at least one nozzle has a Sauter mean droplet size of between 30 and 60 micrometers, and the conical fine homogeneous fog/mist provides a round impact area, uniform and even distribution onto the back side of the at least one solar photovoltaic panel.

* * * * *